United States Patent
Subbotin et al.

(10) Patent No.: US 11,201,489 B2
(45) Date of Patent: Dec. 14, 2021

(54) SYSTEM AND METHOD FOR FAST CHARGING OF LITHIUM-ION BATTERIES

(71) Applicant: Robert Bosch GmbH, Stuttgart (DE)

(72) Inventors: Maksim Subbotin, San Carlos, CA (US); Reinhardt Klein, Mountain View, CA (US); Yongfang Cheng, Mountain View, CA (US); Nikhil Ravi, Redwood City, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 183 days.

(21) Appl. No.: 16/546,505

(22) Filed: Aug. 21, 2019

(65) Prior Publication Data

US 2021/0057919 A1 Feb. 25, 2021

(51) Int. Cl.
| | |
|---|---|
| *H02J 7/00* | (2006.01) |
| *G05B 13/02* | (2006.01) |
| *H01M 10/42* | (2006.01) |
| *H01M 10/48* | (2006.01) |
| *H01M 10/44* | (2006.01) |
| *H01M 10/0525* | (2010.01) |

(52) U.S. Cl.
CPC .......... *H02J 7/007* (2013.01); *G05B 13/0265* (2013.01); *H01M 10/0525* (2013.01); *H01M 10/425* (2013.01); *H01M 10/44* (2013.01); *H01M 10/48* (2013.01); *H02J 7/0047* (2013.01); *H01M 2010/4271* (2013.01)

(58) Field of Classification Search
USPC ........................................................ 320/152
See application file for complete search history.

(56) References Cited

U.S. PATENT DOCUMENTS

| | | | |
|---|---|---|---|
| 9,153,991 B2 | 10/2015 | Chaturvedi et al. | |
| 10,209,314 B2 | 2/2019 | Garcia et al. | |
| 2013/0311115 A1 | 11/2013 | Chaturvedi et al. | |
| 2016/0195587 A1 | 7/2016 | Lee | |
| 2018/0306868 A1 | 10/2018 | Kim et al. | |
| 2019/0252718 A1* | 8/2019 | Takeuchi | H01M 4/485 |
| 2020/0076223 A1* | 3/2020 | Kuriki | H02J 7/0021 |

FOREIGN PATENT DOCUMENTS

WO        2019017991 A1    1/2019

* cited by examiner

*Primary Examiner* — Bryce M Aisaka
(74) *Attorney, Agent, or Firm* — Brooks Kushman P.C.

(57) ABSTRACT

A Li-ion battery management system comprises a Li-ion cell, one or more sensors configured to sense one or more operating conditions of the Li-ion cell, a controller having non-transitory memory for storing machine instructions that are to be executed by the controller and operatively connected to the Li-ion cell, the machine instructions when executed by the controller implement the following functions: receive the one or more operating conditions and a trained machine learning (ML) model, and output an indicator value along a state of charge (SOC) trajectory in response to the one or more operating conditions and the trained ML model to control a fast charge state of the Li-ion cell from a current source.

20 Claims, 3 Drawing Sheets

SYSTEM AND METHOD FOR FAST CHARGING OF LITHIUM-ION BATTERIES

TECHNICAL FIELD

The present disclosure relates to a system and a method of fast charging an electrochemical cell such as a Li-ion battery while utilizing a machine learning (ML) model.

BACKGROUND

Lithium-ion batteries have become common and their use widespread. Fast charging of lithium-ion batteries is one of the technical challenges faced by companies providing various devices that use these batteries such as consumer electronics, power tools, and electric vehicles. Consumers generally prefer a minimal wait time for recharging their smartphone, power drill, electric vehicle, or other electronic device. Hence, battery suppliers and device manufacturers are in competition to deliver devices that charge as quickly as possible. Yet, fast charging may result in overpotential and mechanical stress in the battery that can accelerate the aging process of the battery and result in reduced lifetime.

SUMMARY

According to one embodiment, a Li-ion battery management system is disclosed. The system includes a Li-ion cell and one or more sensors configured to sense one or more operating conditions of the Li-ion cell. The system also includes a controller having non-transitory memory for storing machine instructions that are to be executed by the controller and operatively connected to the Li-ion cell, the machine instructions when executed by the controller implement the following functions: receive the one or more operating conditions and a trained machine learning (ML) model; and output an indicator value along a state of charge (SOC) trajectory in response to the one or more operating conditions and the trained ML model to control a fast charge state of the Li-ion cell from a current source. The SOC trajectory may include a constant current (CC) phase, a constant indicator (CI) phase, and/or a constant voltage (CV) charge phase. The indicator value may be a state of the cell along the SOC trajectory. The indicator value may be an overpotential value. The one or more operating conditions may include one or more of an internal cell temperature, a cell voltage and a current. The machine instructions when executed by the controller may further implement the following function: determine a first indicator value at time (t). The machine instructions when executed by the controller may further implement the following function: determine a second indicator value at time (t+1). The trained ML model may include a training data set including a plurality of individual charge trajectories, and each trajectory is generated for a specific combination of model parameters, initial conditions, and/or ambient temperatures. The trained ML model may be a physics-based trained model.

In an alternative embodiment, a method of fast charging a Li-ion battery cell is disclosed. The method may include sensing one or more operating conditions of the Li-ion cell, receiving the one or more operating conditions and a trained machine learning (ML) model, and outputting an indicator value along a state of charge (SOC) trajectory in response to the one or more operating conditions and the trained ML model to control a fast charge state of the Li-ion cell from a current source. The SOC trajectory may include a constant current (CC) phase, a constant indicator (CI) phase, and/or a constant voltage (CV) charge phase. The indicator value may be a state of the cell along the SOC trajectory. The indicator value may be an overpotential value. The one or more operating conditions may include one or more of an internal cell temperature, a cell voltage, and a current. The trained ML model may include a training set including a plurality of individual charge trajectories, and further comprising generating each trajectory for a specific combination of model parameters, initial conditions, and/or ambient temperatures.

In another embodiment, a method of estimating a battery target indicator value for a Li-ion cell is disclosed. The method may include training a machine learning (ML) model including a training data set including: a plurality of individual charge trajectories, wherein each trajectory is generated for a specific combination of model parameters, initial conditions, and/or ambient temperatures, a charge phase variable, a measurement data set, and an indicator variable. The method may also include sensing one or more operating conditions of the Li-ion cell, receiving the one or more operating conditions and the trained ML model, and outputting an indicator value along a state of charge (SOC) trajectory in response to the one or more operating conditions and the trained ML model. The indicator value may be a state of the cell along the SOC trajectory. The method may also include supplying the training data set from a physics-based model. The measurement data set may include one or more operating conditions of the Li-ion cell. The one or more operating conditions may include one or more of an internal cell temperature, a cell voltage, and a current.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

Reference is being made in detail to compositions, embodiments, and methods of embodiments known to the inventors. However, it should be understood that the disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Lithium ion batteries have become a staple among rechargeable batteries. Yet, despite their prevalence, lithium ion batteries face a variety of challenges. For example, charging of a Li-ion battery is, in most applications, a relatively demanding regiment experienced by the battery. The charging process is a significant contributor for aging and degradation of a Li-ion cell. The degradation of a Li-ion cell is predominantly caused by side-reactions such as lithium plating, which consumes cyclable lithium. Overpotential determines occurrence of the harmful side-reactions. If the overpotential could be correctly estimated, an algorithm could be developed to minimize the side-reactions inside of the Li-ion cell, thus maintaining intended life-time of the battery.

There have been many attempts to charge Li-ion cells in minimal time while trying to minimize their degradation. In general, these methods can be divided in two groups: (1) methods which use only available real-time measurements from the cell, and (2) methods that model internal processes of the cell and use estimates of internal variables to control the charging process.

Figure 1:
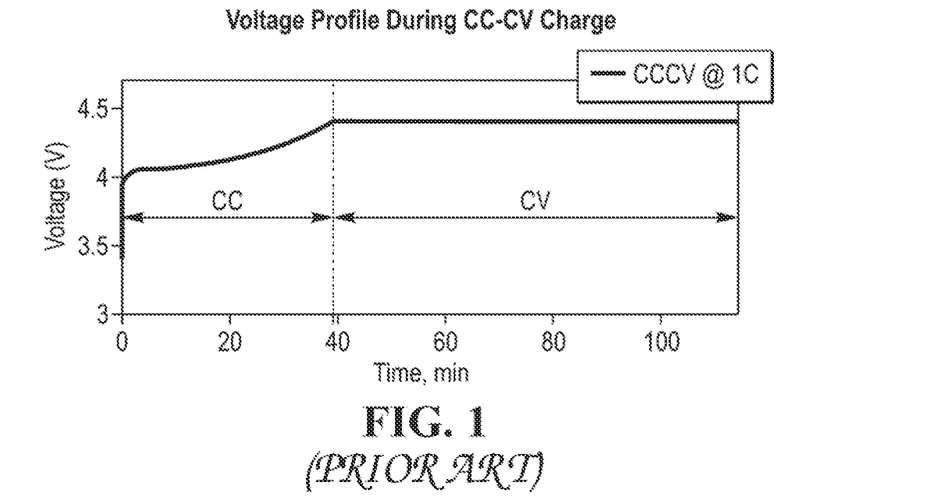
FIG. 1 shows a voltage profile during constant-current constant-voltage (CC-CV) charge of a lithium-ion battery.

One of the most common charge methods in the industry that uses current and voltage measurements is called constant-current constant-voltage method. FIG. 1 shows a characteristic charge voltage profile of the CC-CV method. As can be seen in FIG. 1, the voltage profile includes two phases. The first phase corresponds to a section on the profile where a battery management system (BMS) maintains charge current at constant value. The second phase corresponds to a section where charge current is regulated (reduced) by the BMS to maintain the cell's voltage at constant value. The corresponding current and voltage thresholds used by BMS to control the current allows a designer to tune BMS controller to be more or less aggressive depending on the application. Setting higher threshold values results in faster charging as it allows higher current integral over the same period of time. But such faster charging stresses the Li-ion cell more and may result in faster degradation if the thresholds are set too high. Hence, this method allows a tradeoff between minimizing the charge time and extending the Li-ion battery's life.

In an ideal battery, and without limitation of the charging unit, one could pass all the charge needed to bring a battery from one state of charge (SOC) to another SOC instantaneously. Kinetic limitations in real batteries, however, allow only a finite current to be passed through a battery. Many internal processes of the battery have an influence on the charge transfer capabilities, e.g. finite diffusion rate of lithium ions in the electrolyte, reduction/oxidation of materials other than the active material, formation of resistive films on the active particle surface, and charge transfer limitation between the electrolyte and the active material. The faster the charge transfer is forced to happen, the more strongly these processes affect the health of the battery. Cell manufacturers thus always provide additional information about utilization constraints on their cells. These constraints mostly involve limits on the maximum charge or discharge current, limits of lower and upper cut-off voltages, and the operating temperature domain. Some manufacturers provide these limits at different operating ambient temperatures. All these limits are geared towards the CC/CV charging method, and hence are rather conservative, since the limits are specified for the complete lifetime of the battery.

Research has shown that even though current and voltage thresholds may be used as adequate proxies for the amount of degradation-causing stress in the cell at low and high states of charge (SOC), at medium SOC, the current and voltage thresholds are too conservative and may result in unnecessary extension of the charge process. Alternatively, if the current and voltage thresholds are set too high, they may induce accelerated degradation by causing high stresses towards the ends of their respective phases.

SOC may be defined as the percentage of the remaining charge inside a battery to the full charge, ranging between about 0% and 100%. SOC provides information regarding performance of the battery and information when the battery should be recharged. Furthermore, the BMS may use SOC information for power management. Accurate SOC information is thus critical, especially in some applications such as electric vehicles, where consumers rely on the SOC information to determine their driving range.

It has been shown that standard charging techniques such as CC-CV, if used for fast charging, can result in damage to the battery due to the large currents passed through the battery. These large currents result in dangerous overpotentials and mechanical stress in the battery that causes the battery to age fast resulting in reduced lifetime.

Figure 2:
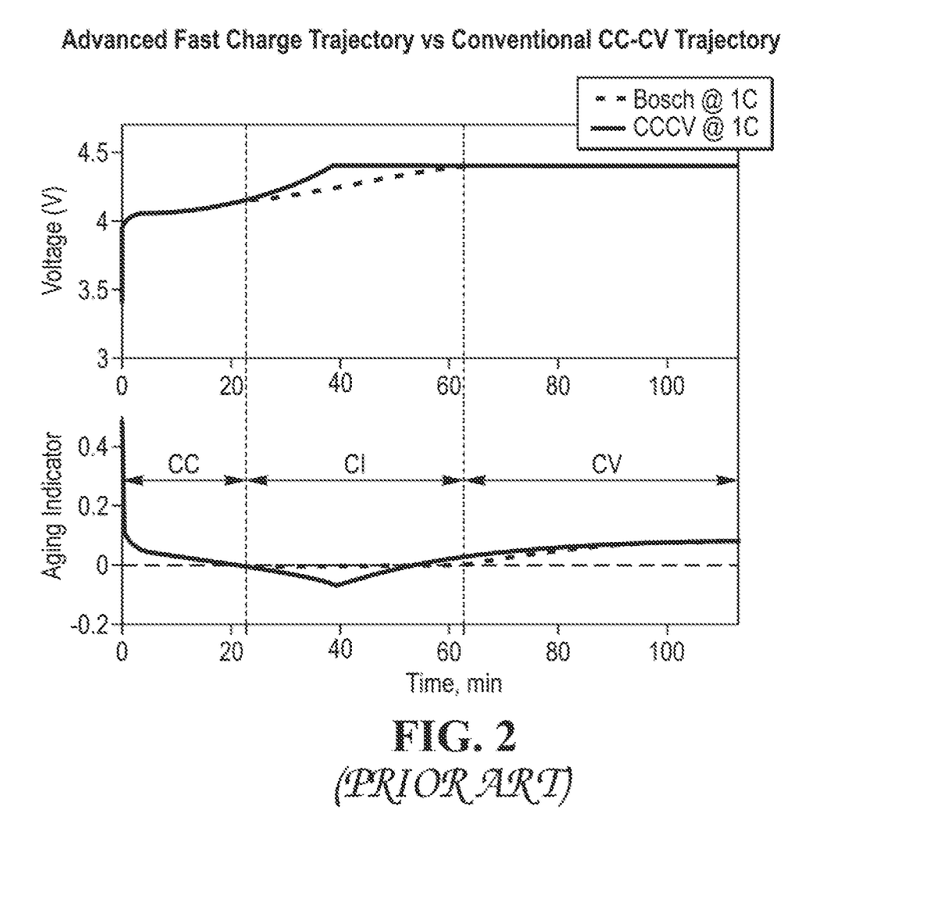
FIG. 2 shows a comparison of a conventional CC-CV voltage profile with a physics-based estimator method voltage profile.

More optimal charge methods have been proposed such as a method that utilizes a real-time estimate of internal battery states. The internal battery states serve as indicators of underlying aging mechanisms. Examples of internal states that may serve as indicators of cell aging may include the overpotential for the Li-plating reaction in the anode, overpotential for electrolyte degradation in the cathode, or both. When thresholds on such indicator variables are used in addition to the current and voltage thresholds by the BMS, the charge process may include more than two phases. FIG. 2 shows an example of the charge trajectory that includes three phases. The first and the last phases are the CC and CV charge phases, correspondingly. The second phase is defined by the BMS controller regulating charge current to maintain the indicator variable at the desired threshold. The respective phase CI is a constant indicator phase. Similar to the current and voltage thresholds, the threshold of the indicator variable provides for a tradeoff between the speed of charge or degradation.

The method utilizing indicator variables provides a more optimal result than the traditional CC-CV method by allowing faster charging with the same rate of degradation or extends battery lifetime while maintaining charge duration. The method utilizes a physics-based Lithium-ion cell state estimator. The estimator provides a number of estimates to a feedback controller which may adjust charge current based on the received estimates. The feedback controller may switch from one phase to another, choosing between various factors limiting charge current based on the implemented control logic and inputs. The inputs may include at least one or a set of indicator variables and measurements.

As a result, the indicator variables may be actively controlled by the feedback controller such that their values do not drop below a threshold value, thus preventing a charge regime with accelerated aging. Such aging regime is visible in FIG. 2 for the conventional CC-CV charge, in which the indicator variable dropped below zero. Unlike the conventional CC-CV voltage profile, the voltage profile does not dip below zero due to limiting of the indicator variable within a certain range when the physics-based estimator was used.

But the estimator-method is relatively computationally expensive because it requires real-time estimation of the cell's internal states with a complex electrochemical model. Real-time estimates of the states can be provided by the state estimator which represents mathematical model of the physical processes taking place in the cell during charge. The mathematical model includes a set of ordinary differential equations with algebraic constraints. A typical Li-ion cell estimator based on such an electrochemical model may have over about 70 dynamic states and since, typically, only a few of them are used by the charging controller as indicator variables during fast charge, the method has certain computational inefficiencies, especially where many cells are used simultaneously such as in an electric vehicle battery pack.

Thus, there is a need for an optimized charge method, especially a fast charge method, which would be efficient, not computationally expensive, and providing a fast charge while maintaining the expected or predetermined battery lifetime.

In one of more embodiments, a system for a fast charge of an electrochemical cell is disclosed. Without limiting the disclosure to a single definition, a fast charge may be characterized as a process of supplying a charge current to a battery cell with the target to increase its SOC to a desired value in minimal amount of time while respecting cell's operating constraints on voltage, current, temperature, and other variables. The charge time period may vary from several seconds to several minutes, or hours. A non-limiting example charge time period may be about 10 to 20 minutes, 11 to 18 minutes, or 12-15 minutes such as 8, 9, 10, 11, 12, 13, 14, 15, 16, 17, 18, 19, or 20 minutes long.

The disclosed system and methods include an ML model instead of or in place of a physics-based estimator. The ML model allows to condense functionality of the physics-based estimator. The ML model may be trained offline, thus reducing computational demand of the BMS, reducing cost, increasing efficiency of the fast charge process.

Figure 3:
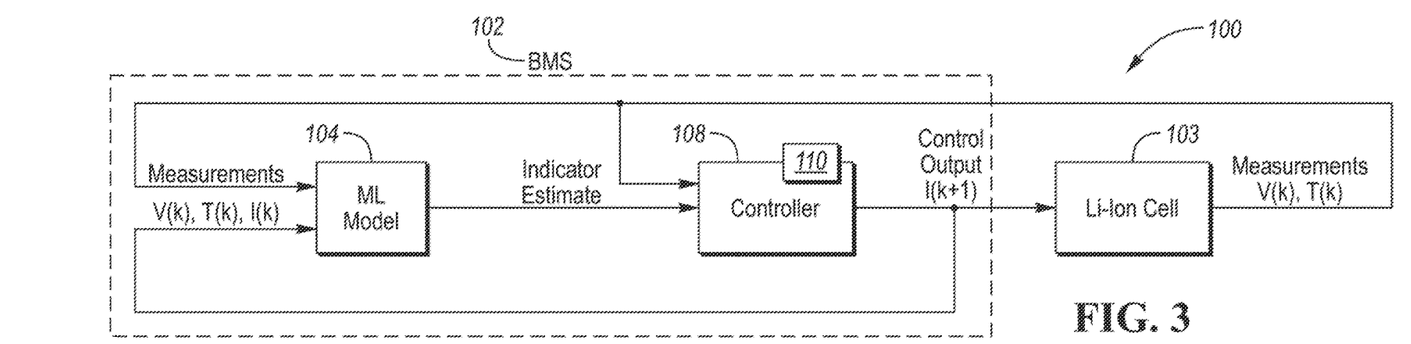
FIG. 3 is a schematic depiction of a non-limiting example of a system for fast charging of a Li-ion battery cell according to one or more embodiments disclosed herein.

FIG. 3 shows a block diagram schematically illustrating a system 100 including a BMS 102 controlling the fast charge process of an electrochemical cell, specifically a Li-ion cell 103, and including an ML model 104. The system 100 may also include one or more of a controller 108 with memory 110, one or more sensors 112, a current source (not depicted), and a model 106 designed to train the ML model 104 offline, as is discussed below. The BMS 102 is operatively connected to the cell 103.

The ML model 104 may be Linear Regression, Logistic Regression, K-Nearest Neighbors (KNN), Support Vector Machine (SVM), Decision Trees (DT), ensembles, or Artificial Neural Network (ANN). The ML model 104 may be embedded in the BMS 102.

During fast charge, the BMS 102 may use the ML model 104 to estimate a target variable to generate a control output. Specifically, the BMS 102 uses the ML model 104 to estimate an optimal or ideal amount(s) of current to be supplied to the cell 103 during the entire duration of a fast charge. The optimal or ideal amount of current may vary in time during the charging process. The optimal or ideal amount of current is an amount of current that results in a minimal duration of or a time period required for a fast charge while achieving minimal damage to the cell as a result of the charging process.

Figure 4:
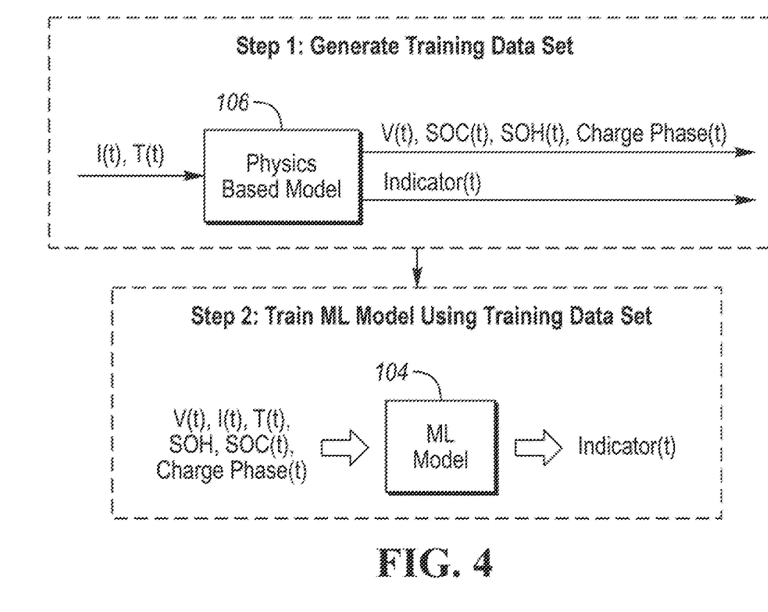
FIG. 4 shows a schematic illustration of the training steps of the ML model disclosed herein.

The ML model 104 is trained offline based on as complete as possible of a set of input data. Accordingly, the ML model 104 is supplied with a training data set and trained based on the data set. The training data set may be generated by a model 106 parametrized and fitted to experimental data. Training of the ML model 104 offline via model 106 is schematically depicted in FIG. 4.

The model 106 may be a physics-based model. The model 106 may be a simulation model capable of simulating internal states of the cell 103. The model 106 may be an electrochemical model providing battery state estimates over a lifetime of the battery. The model 106 may be any model capable of simulating the electrochemical processes of the Li-ion cell. The model 106 may determine the state of a battery based on the battery's degradation level. The model 106 may be capable of predicting future battery states under a possible future charging sequence and evaluating charging performance over an extended time period. The model 106 may approximate nonlinear system of partial differential equations modeling the battery's electrochemical processes into a linearized system of algebraic equations. The model may be a dualfoil model using mass transfer, diffusion, migration, and reaction kinetics to model the electrochemical reactions in the Li-ions cell. The model 106 may include a state filter algorithm such as a Kalman filter for state estimations. The model 106 may be a simplified and computationally efficient model. The model 106 may be an equivalent circuit model. The model 106 may or may not be embedded in the BMS 102.

The training data set generated by the model 106 may include SOC trajectories corresponding to one or more, preferably all expected environmental conditions and/or initial states of the cell 103 from which the charge is initiated. The training data set may further include SOC trajectories corresponding to various ages of the cell 103 and/or possible variations of cell parameters that influence the cell's behavior during the charge process.

More specifically, the training data set may include a plurality or a collection of individual SOC trajectories, where each trajectory is generated for a specific combination of model parameters, initial condition, and ambient temperature.

Since the chemistry of each Li-ion cell 103 changes in time and with use, the Li-ion cell 103 may have different requirements for optimal charging throughout different stages in its lifetime. The ML model 104 is thus trained on or provided data set for different ages and stages of life of the Li-ions cell 103. Varying of the model parameters thus results in charge trajectories corresponding to various ages of the considered Li-ion cell 103 from the beginning of life to end of its expected life. Variation of model parameters also emulates natural distribution of the cell's properties due to inaccuracies in manufacturing processes.

Varying initial conditions from which the charge starts such as the cell's SOC or initial temperature captures the cell's dependency of the charge trajectories on the initial states. Varying ambient temperature results in capturing the influence of environment on the charge trajectories. Ambient temperature, just like internal temperature, has a significant impact on performance of the Li-ion cells and limits their application at both low and high temperature ranges. At temperatures lower than an optimal range of about −20° C. to 60° C., chemical reaction activity and charge-transfer velocity may slow down, leading to decreased ionic conductivity in the electrolyte(s) and lithium-ion diffusivity in the electrode(s). The low temperatures may thus result in reduced energy and power capabilities of the Li-ion cell. Temperatures higher than the optimal range may likewise lead to loss of capacity due to loss of lithium and reduction of active materials and power performance due to increase of internal resistance. Since the temperature information may influence quality of the cell 103 and its lifetime, the initial temperature as well as ambient temperature information are captured in the individual charge trajectories of the training data.

The training data may also include a charge phase variable, a variable indicating in which phase of the charge process, such as CC, CI, or CV for example, the cell 103 is. The SOC trajectory may include a CC phase, a CI phase, and/or a CV phase.

Besides the training data set for different ages and stages of life of the Li-ions cell 103, the ML model 104 is supplied one or more operating conditions or measured data inputs as an offline measurement data set regarding the cell 103. The one or more operating conditions or offline measurement data set may include cell voltage, current, internal temperature, capacity, ambient temperature, the like, or a combination thereof.

The model 106 also feeds a target indicator variable range to the ML model 104 offline. The variable is not measurable. The indicator variable is an estimate of an internal battery state such as reaction overpotential or a state of the cell along the SOC trajectory. The indicator variable and indicator value may vary based on model parameters, initial condition, ambient temperature, the like, or a combination thereof.

After the training data set is provided by the physics-based model 106 to the ML model 104 offline, and the ML model 104 is trained, the ML model 104 is brought or connected online. While online, the ML model 104 may be supplied real time input measurements of the cell or one or more operating conditions such as cell voltage, current, internal temperature, capacity, ambient temperature, the like, or a combination thereof. Based on the training data set, and/or the measurements, the ML model 104 is capable of estimating the indicator variable within the target range. The ML model 104 may accurately estimate the indicator along at least one or all possible charging trajectories. In other words, the ML model 104 may generate an indicator estimate value along the cell's charging trajectory.

In turn, the ML model 104 may provide an output, which is the estimate of the indicator value to the controller 108 in real time along the charge trajectory. The estimate of the indicator value may serve as an input for the controller 108. In response to a receipt of new inputs such as one or more operating conditions or real time measurements, the ML model 104 may generate a new estimated indicator value within the target and provide the same to the controller 108. The generating and/or supplying may happen on a continuous, discontinuous, periodical, or random basis.

The variable may change continuously, discontinuously, periodically, in a regular or irregular interval. A new estimate may be generated by the ML model 104 and provided to the controller 108 continuously, discontinuously, periodically, in a regular or irregular interval. A non-limiting example of the interval may be a millisecond, a second, etc.

The trained ML model 104 may be incorporated into the controller 108. The trained ML model 104 may serve as an input for the controller 108. The controller 108 may output the indicator value.

The controller 108 executes machine instructions stored in the controller's memory 110. The machine instructions may implement the following functions: receive the one or more operating conditions, receive the trained ML model, output an indicator value along an SOC trajectory in response to the one or more operating conditions and the trained ML model to control a fast charge state of the Li-ion cell from a current source, determine a first indicator value at time (t), determine a second indicator value at time (t+1), or the like.

The controller 108 may output an indicator value along an SOC trajectory and/or an amount of current to be provided to the cell 103 during the charging process, specifically during one or more stages of the charging process. The control output may include the amount of current to be supplied in a predetermined time period to the Li-ion cell 103 to achieve the ideal or optimal charge or fast charge.

The ML model 104 is in communication with a controller 108, which may be embedded in the BMS 102 together with the ML model 104. The controller 108 may be operably connected to a current source (not depicted) to which the controller 108 supplies a control output. The control output may include initiating or stopping a supply of current from the current source to the cell 103, increasing, decreasing, adjusting, or maintaining an amount of current to be provided to the cell 103 at any given moment during the charge time period or during the duration of the fast charge, or both.

The controller 108 includes one or more hardware and software components and may be implemented as a digital control device that executes stored program instructions that are stored in its non-transitory memory 110. The controller 108 may be implemented as a digital microcontroller, but in alternative embodiments, the controller 108 is, for example, a general purpose microprocessor, field programmable gate array (FPGA), application specific integrated circuit (ASIC), a digital signal processor (DSP), or any other suitable digital processor that incorporates hardware and software components to enable monitoring of the electrochemical cell 103 and control of the level of input current that is applied to the electrochemical cell 103 during a fast charge process.

The controller 108 may receive the following inputs: one or more operating conditions or real time measurements from the one or more sensors 112, a trained ML model 104, estimates of the indicator from the ML model 104, additional inputs such as predetermined constraint parameters that are used to limit the input current to the cell 103, data corresponding to predetermined physical, chemical, and electrochemical properties of the cell 103, additional data provided from one or more external sources, the like, or a combination thereof. In response to a receipt of new inputs such as a new estimated indicator value or one or more operating conditions, the controller 108 may output a new indicator value, match the estimated indicator value to a target, generate a new control output, supply the same to a current source, the cell 103, or both, or the like. The outputting, matching, generating, and/or supplying may happen on a continuous, discontinuous, or periodical basis.

The memory 110 includes one or more digital data storage devices including, but not limited to, random access memory (RAM), solid-state storage memory including NAND and NOR flash memories or EEPROM memory, magnetic and optical data storage media, and the like. The memory 110 may also store data corresponding to predetermined physical, chemical, and electrochemical properties of the electrochemical cell 103, the measurements of current, voltage, or temperature of the cell 103, or ambient temperature, the like, or a combination thereof. The memory 110 may be non-transitory memory. The memory 110 may also store the ML model 104 data corresponding to the estimated target indicator variable, predetermined constraint parameters that are used to limit the input current to the electrochemical cell 103, sensor data received from one or more sensors 112 in the system 100, the current source data, machine instructions that are to be executed by the controller 108.

The system 100 may include one or more sensors 112 such as the cell 103 current sensor, voltage sensor, ambient temperature sensor, cell internal temperature sensor, one or more additional sensors, or a combination thereof. The one or more sensors 112 may be located within the cell 103, on the outer surface of the cell 103, or both. The one or more sensors 112 may sense one or more operating conditions, a measurement data or data set, provide the one or more operating conditions or measurement data or data set as input to the controller 108, the ML model 104, and/or BMS in real time, offline, or both. The data from the one or more sensors 112 may be used by the controller 108 and/or the ML model 104 to generate the target indicator variable value.

The battery cell 103 includes two electrodes that are electrically connected to a current source to enable the current source to deliver an input electric current that charges the cell 103. The cell 103 may include multiple electrochemical cells. A battery cell 103 may include one or more electrochemical cells that are integrated into a single physical package with two electrical terminals that receive current from an external current source during the fast charging operation. The battery package may optionally include one or more of the controller 108 and sensors 112 to control the charging process of the battery.

In one or more embodiments, a fast charge process of an electrochemical cell 103 is described herein. The method may include generating training data and training the ML model 104 offline. The trained ML model 104 may be connected online to accurately estimate an indicator value along at least one charging trajectory. The method may include offline generating the data set that covers all possible charging trajectories as discussed above.

The method may include the disclosed model development including selection of machine learning model architecture and model inputs. As FIG. 4 indicates, the method may include offline generating of a training data set by the physics-based model 106 capable of producing experimentally verified estimate of the desired indicator variable value in response to provided inputs. The training data set may include charging trajectories, charge phase data, as well as an offline measurement data set including voltage, current, and temperature of the battery cell 103. The method may include offline training the ML model 104 with the training data set.

The method may include setting a target, a predetermined target, or a predetermined value for the variable. The variable may be an internal state of the battery cell 103 along the SOC trajectory such as reaction overpotential during charging. The method may further include setting an indicator for the target. The method may further include providing the indicator variable to the ML model 104.

The method may further include connecting or bringing the ML model 104 online once the ML model 104 is trained with the generated training data set offline. The method may include providing the trained ML model as input to the controller 108. The method may further include providing one or more operating conditions or real time measurements of the cell 103 to the ML model once the ML model 104 is connected online, as FIG. 3 schematically depicts. The generated training data set and/or the real time measurements or the one or more operating conditions provide sufficient information to the ML model 104 or the controller 108 to accurately estimate the indicator value online along the charging trajectory. Once the estimated indicator is determined by the ML model 104, the method may include supplying, by the ML model 104, the estimated indicator to the controller 108.

The method may include executing machine instructions by the controller 108, the machine instructions implementing the following functions: receiving the one or more operating conditions and a trained ML model, outputting an indicator value along an SOC trajectory in response to the one or more operating conditions and the trained ML model to control a fast charge state of the Li-ion cell from a current source, determining a first indicator value at time (t), determining a second indicator value at time (t+1), or the like.

The method may further include matching, by the controller 108, the estimated indicator to the predetermined target. The method may further include receiving, by the controller 108, one or more controller inputs. The one or more controller inputs may include the one or more operating conditions or one or more real time measurements from one or more sensors 112, the trained ML model, the indicator estimate from the ML model 104, the like, or a combination thereof. The method may further include outputting a control output from the controller 108 in the form of an indicator value along a state of charge (SOC) trajectory or an amount of current to be supplied from a current source to the cell 103 to accomplish a fast charge in the minimum amount of time with minimal damage to the cell 103.

The method may also include measuring one or more operating conditions such as voltage, current, capacity, internal temperature of the cell 103, ambient temperature, and/or other properties of the cell 103 and/or the system 100. The measuring may be conducted once, at least one time, once or more, continuously, discontinuously, randomly, regularly, during, before, and/or after the fast charge process, in real time, online, offline, or a combination thereof. The method may further include collecting the measurements at least once or more times, in a regular or irregular interval, continuously, or discontinuously from the one or more sensors 112. The method may include providing or supplying the measurements to the model 106. The method may include providing the real time measurements as real time input to the ML model 104, the BMS 102, the controller 108, or a combination thereof.

The method may include generating the estimated indicator value once, at least one time, once or more, continuously, discontinuously, randomly, regularly, during, before, and/or after the fast charge process. The generating may be in response to the ML model 104, and/or the controller 108 receiving a new set of inputs such as one or more operating conditions, measurements of voltage, current, and/or temperature of the cell 103, advance in learning of the ML model 104, or both.

The method may include further learning of the ML model 104 from the real time or offline inputs from the specific cell 103, external data, additional training data set, or a combination thereof before, during, and/or after the fast charge process.

The method may include initiating and/or stopping to output the control output to a current source. The method may include initiating and/or stopping a flow of current from the current source of the cell 103. The method may include adjusting, increasing, decreasing, changing, maintaining, or regulating the amount of current being supplied to the cell 103 during the charge process.

The method may include fast charging the cell 103 to a predetermined value. The predetermined value may be about 40, 50, 55, 60, 65, 70, 75, 80, 85, 90, 91, 92, 93, 94, 95, 96, 97, 98, 99, or 100% SOC or at full capacity. Capacity refers to the total amount of charge capable to be drawn from the cell until the cell is depleted. A fully charged cell has an SOC of 100%.

Figure 5:
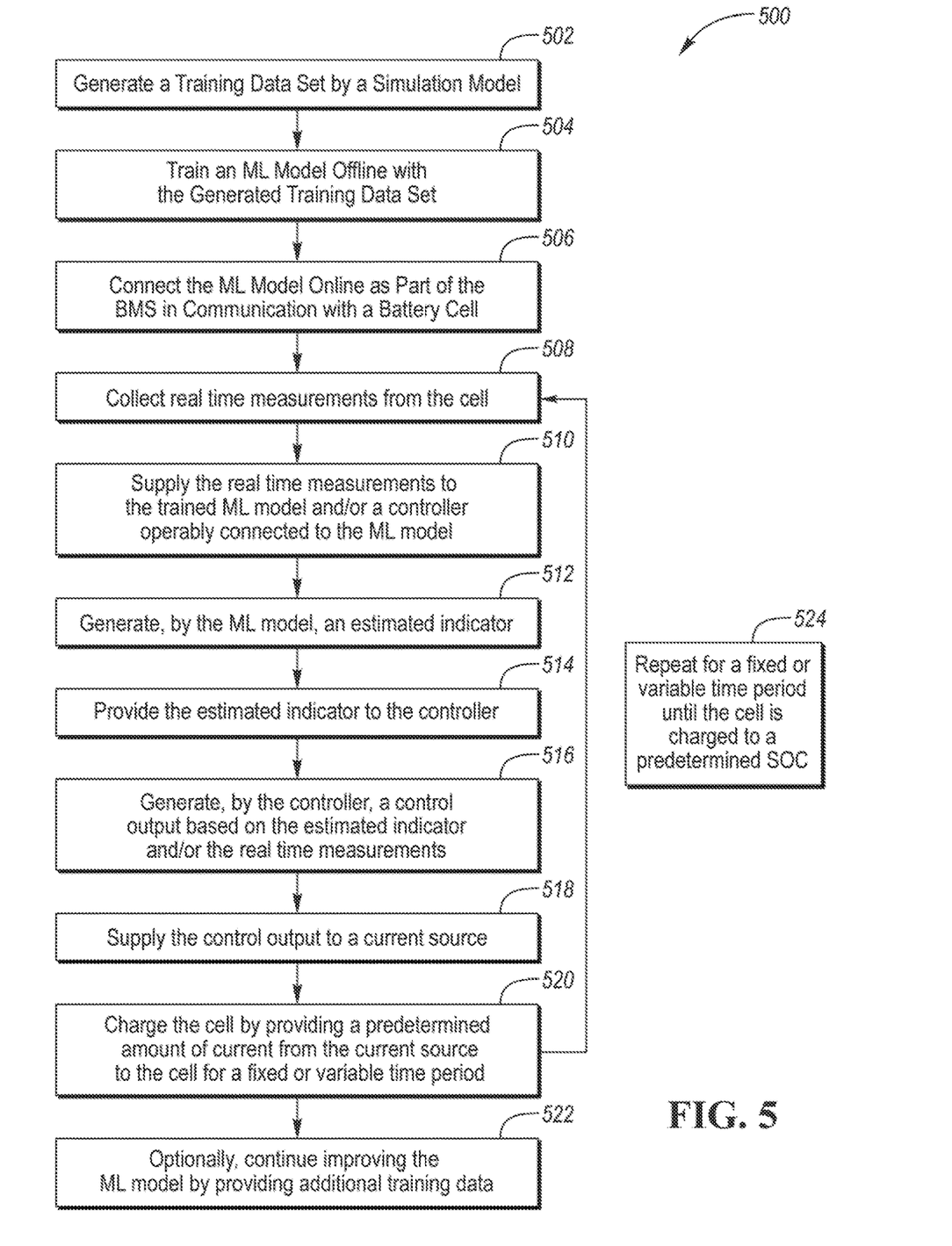
FIG. 5 is a schematic depiction of a non-limiting example of a set of process steps disclosed herein.

A non-limiting example of a sequence of the method steps is depicted in FIG. 5. FIG. 5 schematically shows the process 500 including the ML training process steps 502 and 504, the estimating of the indicator in steps 506 to 514, and the fast charge process of steps 516 to 524.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A Li-ion battery management system comprising:
   a Li-ion cell;
   one or more sensors configured to sense one or more operating conditions of the Li-ion cell;
   a controller having non-transitory memory for storing machine instructions that are to be executed by the controller and operatively connected to the Li-ion cell, the machine instructions when executed by the controller implement the following functions:
   receive first values of the one or more operating conditions at time (t) and second values of the one or more operating conditions at time (t+1) and a trained machine learning (ML) model including a first state of charge (SOC) trajectory at a first stage of a fast charge process and a second SOC trajectory at a second stage of the fast charge process; and
   output a first indicator value along the first SOC trajectory in response to the first values of the one or more operating conditions and the trained ML model and a second indicator value along the second SOC trajectory in response to the second values of the one or more operating conditions and the trained ML model to control the fast charge process of the Li-ion cell from a current source.

2. The Li-ion battery management system of claim 1, wherein the SOC trajectory includes a constant current (CC) phase, a constant indicator (CI) phase, and/or a constant voltage (CV) charge phase.

3. The Li-ion battery management system of claim 1, wherein the first and second indicator values are first and second states of the Li-ion cell along the first and second SOC trajectories.

4. The Li-ion battery management system of claim 1, wherein the first and second indicator values are overpotential values.

5. The Li-ion battery management system of claim 1, wherein the one or more operating conditions includes one or more of an internal cell temperature, a cell voltage and a current.

6. The Li-ion battery management system of claim 1, wherein the first SOC trajectory is different than the second SOC trajectory.

7. The Li-ion battery management system of claim 6, wherein the first stage of the fast charge process is earlier than the second stage of the fast charge process.

8. The Li-ion battery management system of claim 1, wherein the trained ML model includes a training data set, the training data set includes a plurality of individual charge trajectories, and each trajectory is generated by the trained ML model for a specific combination of model parameters, initial conditions, and/or ambient temperatures.

9. The Li-ion battery management system of claim 1, wherein the trained ML model is a physics-based trained model.

10. A method of fast charging a Li-ion battery cell, the method comprising:

sensing one or more operating conditions of the Li-ion cell;

receiving first values of the one or more operating conditions at time (t) and second values of the one or more operating conditions at time (t+1) and a trained machine learning (ML) model including a first state of charge (SOC) trajectory at a first stage of a fast charge process and a second SOC trajectory at a second stage of the fast charge process; and outputting a first indicator value along the first SOC trajectory in response to the first values of the one or more operating conditions and the trained ML model and a second indicator value along the second SOC trajectory in response to the second values of the one or more operating conditions and the trained ML model to control the fast charge process of the Li-ion cell from a current source.

11. The method of claim 10, wherein the SOC trajectory includes a constant current (CC) phase, a constant indicator (CI) phase, and/or a constant voltage (CV) charge phase.

12. The method of claim 10, wherein the first and second indicator values are first and second states of the Li-ion cell along the first and second SOC trajectories.

13. The method of claim 10, wherein the first and second indicator values are overpotential values.

14. The method of claim 10, wherein the one or more operating conditions includes one or more of an internal cell temperature, a cell voltage, and a current.

15. The method of claim 10, wherein the trained ML model includes a training set including a plurality of individual charge trajectories, and further comprising generating each trajectory by the trained ML model for a specific combination of model parameters, initial conditions, and/or ambient temperatures.

16. A method of estimating a battery target indicator value for a Li-ion cell, the method comprising:

training a machine learning (ML) model including a training data set including: a plurality of individual charge trajectories including a first state of charge (SOC) trajectory at a first stage of a fast charge process and a second SOC trajectory at a second stage of the fast charge process, wherein each trajectory is generated by the trained ML model for a specific combination of model parameters, initial conditions, and/or ambient temperatures, a charge phase variable, a measurement data set, and an indicator variable;

sensing one or more operating conditions of the Li-ion cell;

receiving first values of the one or more operating conditions at time (t) and second values of the one or more operating conditions at time (t+1) and the trained ML model including the first and second SOC trajectories; and outputting a first indicator value along the first SOC trajectory in response to the first values of the one or more operating conditions and the trained ML model and a second indicator value along the second SOC trajectory in response to the second values of the one or more operating conditions and the trained ML model to control the fast charge process of the Li-ion cell from a current source.

17. The method of claim 16, wherein the first and second indicator values are first and second states of the Li-ion cell along the first and second SOC trajectories.

18. The method of claim 16, further comprising supplying the training data set from a physics-based model.

19. The method of claim 16, wherein the measurement data set includes one or more operating conditions of the Li-ion cell.

20. The method of claim 16, wherein the one or more operating conditions includes one or more of an internal cell temperature, a cell voltage, and a current.

* * * * *

UNITED STATES PATENT AND TRADEMARK OFFICE
CERTIFICATE OF CORRECTION

PATENT NO. : 11,201,489 B2
APPLICATION NO. : 16/546505
DATED : December 14, 2021
INVENTOR(S) : Maksim Subbotin et al.

It is certified that error appears in the above-identified patent and that said Letters Patent is hereby corrected as shown below:

In the Claims

Column 12, Line 66, Claim 10:
After "A method of fast charging a Li-ion"
Delete "battery"

Signed and Sealed this
Eleventh Day of April, 2023

Katherine Kelly Vidal
*Director of the United States Patent and Trademark Office*